United States Patent
Jankins et al.

(10) Patent No.: US 9,936,237 B2
(45) Date of Patent: *Apr. 3, 2018

(54) METHOD AND APPARATUS FOR DISTRIBUTING GEOGRAPHICALLY RESTRICTED VIDEO DATA IN A TELEVISION SYSTEM

(71) Applicant: AT&T Intellectual Property I, LP, Atlanta, GA (US)

(72) Inventors: Richard G. Jankins, San Antonio, TX (US); Thomas Scott Webster, San Antonio, TX (US); Eric Cabading, Spring Branch, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/945,392

(22) Filed: Nov. 18, 2015

(65) Prior Publication Data

US 2016/0198205 A1    Jul. 7, 2016

Related U.S. Application Data

(63) Continuation of application No. 12/962,870, filed on Dec. 8, 2010, now Pat. No. 8,566,859, and a (Continued)

(51) Int. Cl.
*H04N 21/258* (2011.01)
*H04N 21/643* (2011.01)
(Continued)

(52) U.S. Cl.
CPC ... *H04N 21/25841* (2013.01); *H04N 7/17318* (2013.01); *H04N 21/235* (2013.01); *H04N 21/2541* (2013.01); *H04N 21/2543* (2013.01); *H04N 21/262* (2013.01); *H04N 21/435* (2013.01); *H04N 21/458* (2013.01);
(Continued)

(58) Field of Classification Search
CPC ............. H04N 21/235; H04N 21/2541; H04N 21/2543; H04N 21/25841; H04N 21/262; H04N 21/435; H04N 21/458; H04N 21/4627; H04N 21/47; H04N 21/482; H04N 21/6125; H04N 21/64322; H04N 21/84; H04N 7/17318
See application file for complete search history.

(56) References Cited

U.S. PATENT DOCUMENTS

6,785,904 B1    8/2004 Moubarak et al.
7,039,614 B1    5/2006 Candelore et al.
(Continued)

*Primary Examiner* — Rong Le
(74) *Attorney, Agent, or Firm* — Guntin & Gust, PLC; Robert Gingher (57) ABSTRACT

A method for distributing geographically restricted video data in an internet protocol television system, the method including but not limited to determining at a television server computer at least three geographic restriction zones for the geographically restricted video data and instructions to determine at least three different duration time delays for each of at least three geographic restriction zones, wherein the at least three geographic restriction zones are based on physical proximity of a television client device to a geographic origin of the geographically restricted video data.

20 Claims, 6 Drawing Sheets

Related U.S. Application Data continuation of application No. 12/843,757, filed on Jul. 26, 2010, now Pat. No. 7,877,767, and a continuation of application No. 11/497,922, filed on Aug. 1, 2006, now Pat. No. 7,774,808, and a continuation of application No. 14/059,115, filed on Oct. 21, 2013, now Pat. No. 9,232,250.

(51) Int. Cl.

| | | |
|---|---|---|
| H04N 21/262 | (2011.01) | |
| H04N 21/254 | (2011.01) | |
| H04N 21/4627 | (2011.01) | |
| H04N 21/458 | (2011.01) | |
| H04N 21/61 | (2011.01) | |
| H04N 21/2543 | (2011.01) | |
| H04N 7/173 | (2011.01) | |
| H04N 21/235 | (2011.01) | |
| H04N 21/435 | (2011.01) | |
| H04N 21/482 | (2011.01) | |
| H04N 21/84 | (2011.01) | |
| H04N 21/47 | (2011.01) | |

(52) U.S. Cl.
CPC ....... H04N 21/4627 (2013.01); H04N 21/482 (2013.01); H04N 21/6125 (2013.01); H04N 21/64322 (2013.01); H04N 21/84 (2013.01); H04N 21/47 (2013.01)

(56) References Cited

U.S. PATENT DOCUMENTS

| | | |
|---|---|---|
| 2002/0023010 A1 | 2/2002 | Rittmaster et al. |
| 2002/0154777 A1 | 10/2002 | Candelore et al. |
| 2003/0126594 A1* | 7/2003 | Tsuria .................. H04N 7/165 725/25 |
| 2003/0220100 A1* | 11/2003 | McElhatten .......... G06F 3/0482 455/418 |
| 2004/0177368 A1 | 9/2004 | Pelkey et al. |
| 2005/0272405 A1 | 12/2005 | Tomlinson et al. |
| 2007/0124750 A1 | 5/2007 | Sisodia et al. |

\* cited by examiner

METHOD AND APPARATUS FOR DISTRIBUTING GEOGRAPHICALLY RESTRICTED VIDEO DATA IN A TELEVISION SYSTEM

RELATED CASES

This patent application is a continuation of U.S. patent application Ser. No. 14/059,115 filed on Oct. 21, 2013, entitled "A Method And Apparatus For Distributing Geographically Restricted Video Data In An Internet Protocol Television (IPTV) System" by Jankins et al., which is a continuation of U.S. patent application Ser. No. 12/962,870, filed on Dec. 8, 2010, entitled "A Method And Apparatus For Distributing Geographically Restricted Video Data In An Internet Protocol Television (IPTV) System," by Jankins et al., now U.S. Pat. No. 8,566,859, which is a continuation of U.S. patent application Ser. No. 12/843,757, filed on Jul. 26, 2010, entitled "A Method And Apparatus For Distributing Geographically Restricted Video Data In An Internet Protocol Television (IPTV) System" by Jankins et al., now U.S. Pat. No. 7,877,767, which is a continuation of U.S. patent application Ser. No. 11/497,922, filed on Aug. 1, 2006, entitled "A Method And Apparatus For Distributing Geographically Restricted Video Data In An Internet Protocol Television (IPTV) System" by Jankins et al., now U.S. Pat. No. 7,774,808. The contents of U.S. patent application Ser. Nos. 11/497,922, 12/843,757 and 12/962,870 are hereby incorporated by reference herein in their entirety.

FIELD OF THE DISCLOSURE

The present disclosure relates to distributing geographically restricted video data.

BACKGROUND

In recent years, with the proliferation of sources of television (TV) programming including conventional terrestrially broadcast TV, cable TV, and satellite-delivered TV, numerous programming choices exist for a consumer. Consumers often desire to have a guide which shows the programming choices available at various times. The magazine, TV Guide, is one well-known example of a printed programming guide. More recently, electronic program guides (EPGs) have become available for viewing on screen by a television audience.

While printed program guides have enjoyed success over the years, they have some drawbacks. First of all, with the large number of programming choices at any given time, it becomes increasingly difficult for a consumer to make a selection. This difficulty is compounded by the fact that a typical printed guide is usually printed for a designated marketing area (DMA), which, in a very crude approximation, is generally an area of about a 100-mile radius from the location of the broadcast towers. Numerous independent municipalities are located within every DMA. This can result in a programming guide which contains programs which are not available to a particular customer. For example, since there are often several independent cable TV providers servicing the various communities in a DMA, with each cable TV company providing different services, any one viewer may need to sift through programming which is not accessible to them.

Moreover, certain programs are not available because the programs are blacked out with a certain radius of the event. For example, a football game may be blacked out in a city where it is being played to encourage viewers to buy tickets and actually attend the game rather than watching the game on television.

BRIEF DESCRIPTION

DETAILED DESCRIPTION

In one aspect of a particular embodiment a method is disclosed for distributing geographical restriction data in an internet protocol television (IPTV) system. The method includes accepting at an IPTV server, a request from an IPTV client for the restriction data related to geographically restricted video data; determining at the server, a plurality of geographic restriction zones for the geographically restricted video data; and sending from the server to the client a message containing the restriction data related to at least one of the plurality of restriction zones.

In another aspect of a particular embodiment the message further includes electronic program guide (EPG) formatted data containing the restriction data. In another aspect of a particular embodiment the client comprises an IPTV set top box (STB), the method further includes selecting one of the plurality of restriction zones containing the client and determining a fee for receiving the video data in the selected restriction zone, the EPG further comprises the fee. In another aspect of a particular embodiment the restriction zone is selected using a geographical information system to determine a spatial relationship between the client and the restriction zone.

In another aspect of a particular embodiment the method further includes accepting at the server, from the client, a selection from the EPG data requesting the video data and sending the requested video data from the server to the remote client. In another aspect of a particular embodiment the message further comprises data indicating IPTV set top boxes in each of the plurality of restriction zones and the client is a service provider in the IPTV system. In another aspect of a particular embodiment the message further comprises IPTV clients selected from the group consisting of clients that are receiving the video data in each of the restriction zones and newly installed (in service less than 30 days) STBs in each of the restriction zones.

In another particular embodiment a method for receiving geographical restriction data in an internet protocol television (IPTV) system is disclosed. The method includes selecting, at an IPTV client device in a geographic restriction zone, an electronic program guide (EPG) listing for a geographically restricted video data segment; sending from the client device a request for restriction data for the selected video data segment to an IPTV server; and receiving at the IPTV client device the restriction data in an EPG data format for the selected video data from the IPTV server.

In another aspect of a particular embodiment the restriction data further includes data indicating a fee for receiving the video data at the IPTV client device. In another aspect of a particular embodiment the method further includes sending a request for the video data from the client device to an IPTV server and receiving at the client device the video data from the IPTV server.

In another particular embodiment a computer readable medium containing a computer program for distributing geographical restriction data in an internet protocol television (IPTV) system is disclosed. The computer program includes instructions to accept at an IPTV server, a request from an IPTV client for the restriction data related to geographically restricted video data; instructions to determine at the server, a plurality of geographic restriction zones for the geographically restricted video data; and instructions to send from the server to the client a message containing the restriction data related to at least one of the plurality of restriction zones.

In another aspect of a particular embodiment the message further includes an electronic program guide (EPG) formatted data containing the restriction data. In another aspect of a particular embodiment the client comprises an IPTV set top box, the computer program further includes instructions to select one of the plurality of restriction zones containing the client and determining a fee for receiving the video data in the selected restriction zone, the EPG further includes the fee.

In another aspect of a particular embodiment the restriction zone is selected using a geographical information system to determine a spatial relationship between the client and the restriction zone. In another aspect of a particular embodiment the computer program further includes instructions to accept at the server, from the client a selection from the EPG requesting the video data and instructions to send the requested video data from the server to the remote client. In another aspect of a particular embodiment the message further comprises data indicating IPTV set top boxes in each of the plurality of restriction zones and the client further comprises a service provider in the IPTV system.

In another aspect of a particular embodiment the message further comprises IPTV clients selected from the group consisting of clients that are receiving the video data in each of the restriction zones and new STBs in each of the restriction zones.

In another particular embodiment a computer readable medium for containing a computer program for receiving geographical restriction data in an internet protocol television (IPTV). The computer program includes instructions to select, at an IPTV client device in a geographic restriction zone, an electronic program guide (EPG) listing for a geographically restricted video data segment; instructions to send from the client device a request for restriction data for the selected video data segment to an IPTV server; and instructions to receive at the IPTV client device the restriction data in EPG data for the selected video data from the IPTV server.

In another aspect of a particular embodiment the restriction data further includes data indicating a fee for receiving the video data at the IPTV client device. In another aspect of a particular embodiment the computer program further includes instructions to send a request for the video data from the client device to an IPTV server and instructions to receive at the client device the video data from the IPTV server.

In another particular embodiment a data structure in memory is disclosed. The data structure includes a video data identifier field for containing data indicating an identifier for a geographically restricted video data segment; a video event location field for containing data indicative of a locus (geographic location) of a video event location for the geographically restricted video segment; a geographical radius restriction distances field for containing data which indicates the radius of the geographical restriction zones relative to the video event location; and a first restriction zone price field for containing data indicating a fee for viewing the geographically restricted video data at an STB in a first restriction zone associated with the video data identifier.

In another aspect of a particular embodiment the data structure further includes a restriction zone radius field for containing data indicating a radius of a second restriction zone relative to the locus of the event; a second restriction zone price field is provided for containing data indicating a fee or price for viewing the geographically restricted video data segment data at an STB in a second restriction zone associated with the video data identifier; a third restriction zone radius field for containing data indicating a radius of a third restriction zone relative to the locus of the event; and a third restriction zone price field for containing data indicating a fee for viewing the geographically restricted video data associated with the video data identifier at an STB in a third restriction zone.

In another particular embodiment in an IPTV system having a graphical user interface (GUI) including a display and a selection device, a method of providing and selecting from the GUI on the display is disclosed. The method includes receiving electronic program guide (EPG) formatted data containing listings for geographic restricted video data; displaying the EPG formatted data on the display; receiving a first EPG listing selection signal indicative of the selection device pointing at a first selected EPG listing; and in response to the selection signal, sending data indicating a request to an IPTV server requesting geographic restriction data for the first selected EPG listing.

In another aspect of a particular embodiment the method further includes receiving the geographic restriction data; displaying the restriction data in an EPG format on the display; receiving a second EPG listing selection signal indicative of the selection device pointing at a second EPG selected EPG listing; and in response to the second signal, sending a request for the geographically restricted video data to an IPTV server requesting the geographically restricted video data. In another aspect of a particular embodiment the method further includes receiving the geographically restricted video data from the IPTV server.

In an illustrative embodiment, geographic location information is obtained from a geographic information system (GIS), or from other systems for providing a position signal, is used to determine at a server in an IPTV system whether or not a processor at a remote client, for example a set top box (STB) requesting the information is within a restricted (or limited) or non-restricted geographic zone (the restricted and non-restricted geographic zones are referred to as "restriction zones"). This determination can be made by any suitable procedure, including, but not limited to, comparing the geographic information provided by the recipient processor (STB) and positioning system with a list of non-restricted or non-limited (or restricted) geographic locations or regions. Thus, according to some illustrative embodiments, geographically restricted video data may be provided or not provided to a client such as an IPTV STB (that is, access to the video data may be allowed or denied) dependent on the geographic information provided by the recipient (remote client) processor. If a recipient (remote client, i.e., STB) processor provides geographic information corresponding to a restricted geographic location or region, then the video data server/provider processor will be controlled to not provide selective information to the recipient (remote client) processor. On the other hand, if a recipient (remote client) processor provides geographic information corresponding to a non-restricted geographic location or region or a restriction zone in which the video data is available for a fee, then the provider processor (server) is controlled to provide the selective information geographically restricted video data to the recipient client.

In further embodiments, a set of rules may be implemented, which depend upon the geographic information or a spatial relationship between the client STB and the restriction zones (and, thus, the geographic location or region of the recipient processor), such that various restrictions or limitations may be implemented for various geographic locations or regions. Thus, if a recipient processor provides geographic information corresponding to a first geographic location or region, then the provider processor may be controlled to not provide geographically restricted video data to the recipient processor, unless further requirements are met. Other geographic locations or regions may be associated with similar or other requirements, limitations or restrictions to the access of information from the provider processor.

A geographic information or geographical information system (GIS) is a system for creating, storing, analyzing and managing spatial data and associated attributes. In the strictest sense, it is a computer system capable of integrating, storing, editing, analyzing, sharing, and displaying geographically-referenced information. In a more generic sense, GIS is a tool that allows users to create interactive queries (user created searches), analyze the spatial information, and edit data. The GIS can accept an STB street address or latitude longitude position and geographic restriction zone data to determine whether a fee is required to view video data at a particular STB.

GIS location information can be created through geocoding. Geocoding is calculating spatial locations (X,Y coordinates) from street addresses. A reference theme is required to geocode individual addresses, such as a road centerline file with address ranges. The individual address locations are interpolated, or estimated, by examining address ranges along a road segment. These are usually provided in the form of a table or database. The GIS will then place a marker approximately where that address belongs along the segment of centerline. For example, an address point of 500 will be at the midpoint of a line segment that starts with address 1 and ends with address 1000. Geocoding can also be applied against actual parcel data, typically from municipal tax maps. In this case, the result of the geocoding will be an actually positioned space as opposed to an interpolated point.

Various algorithms are used to help with address matching when the spellings of addresses differ. Address information that a particular entity or organization has data on, such as the post office, may not entirely match the reference theme. There could be variations in street name spelling, community name, etc. Consequently, the user generally has the ability to make matching criteria more stringent, or to relax those parameters so that more addresses will be mapped. Care must be taken to review the results so as not to erroneously map addresses incorrectly due to overzealous matching parameters.

Geocoding is the process of assigning geographic identifiers (e.g., codes or geographic coordinates expressed as latitude-longitude) to map features and other data records, such as street addresses. One can also geocode media, for example where a picture was taken, IP Addresses, and anything that has a geographic component. With geographic coordinates, the features can then be mapped and entered into the GIS. A geocoder is a piece of software or a (web) service that helps in this process.

Address interpolation makes use of street GIS data, where the street network is already mapped within the geographic coordinate space. Each street segment is attributed with address ranges (e.g., house numbers from one segment to the next). Geocoding takes an address, matches it to a street and specific segment (such as a block, in towns that use the "block" convention). Geocoding then interpolates the position of the address, within the range along the segment.

Other means of geocoding might include locating a point at the centroid (center) of a land parcel, if parcel (property) data is available in the GIS database. In rural areas or other places lacking high quality street network data and addressing, GPS is useful for mapping a location. For traffic accidents, geocoding to a street intersection or midpoint along a street centerline is a suitable technique. It is also possible to use a combination of these geocoding techniques—using a particular technique for certain cases and situations and other techniques for other cases.

Reverse geocoding is the process of returning an estimated street address number as it relates to a given coordinate. For example, a user can click on a road centerline theme (thus providing a coordinate) and have information returned that reflects the estimated house number. This house number is interpolated from a range assigned to that road segment. If the user clicks at the midpoint of a segment that starts with address 1 and ends with 100, the returned value will be somewhere near 50. Note that reverse geocoding does not return actual addresses, only estimates of what should be there based on the predetermined range.

Recently an international foundation (OSGEO) was started to support and build the highest-quality open source geospatial software. With the broad use of non-proprietary and open data formats such as the Shape File format for vector data and the Geotiff format for raster data, as well as the adoption of Open Geospatial Consortium (OGC) protocols such as Web Mapping Service (WMS) and Web Feature Service (WFS), development of open source software continues to evolve, especially for web and web service oriented applications. Well-known open source GIS software includes GRASS GIS, Quantum GIS, MapServer, GDAL/OGR, PostGIS, uDig, OpenJUMP, etc.

Figure 1:
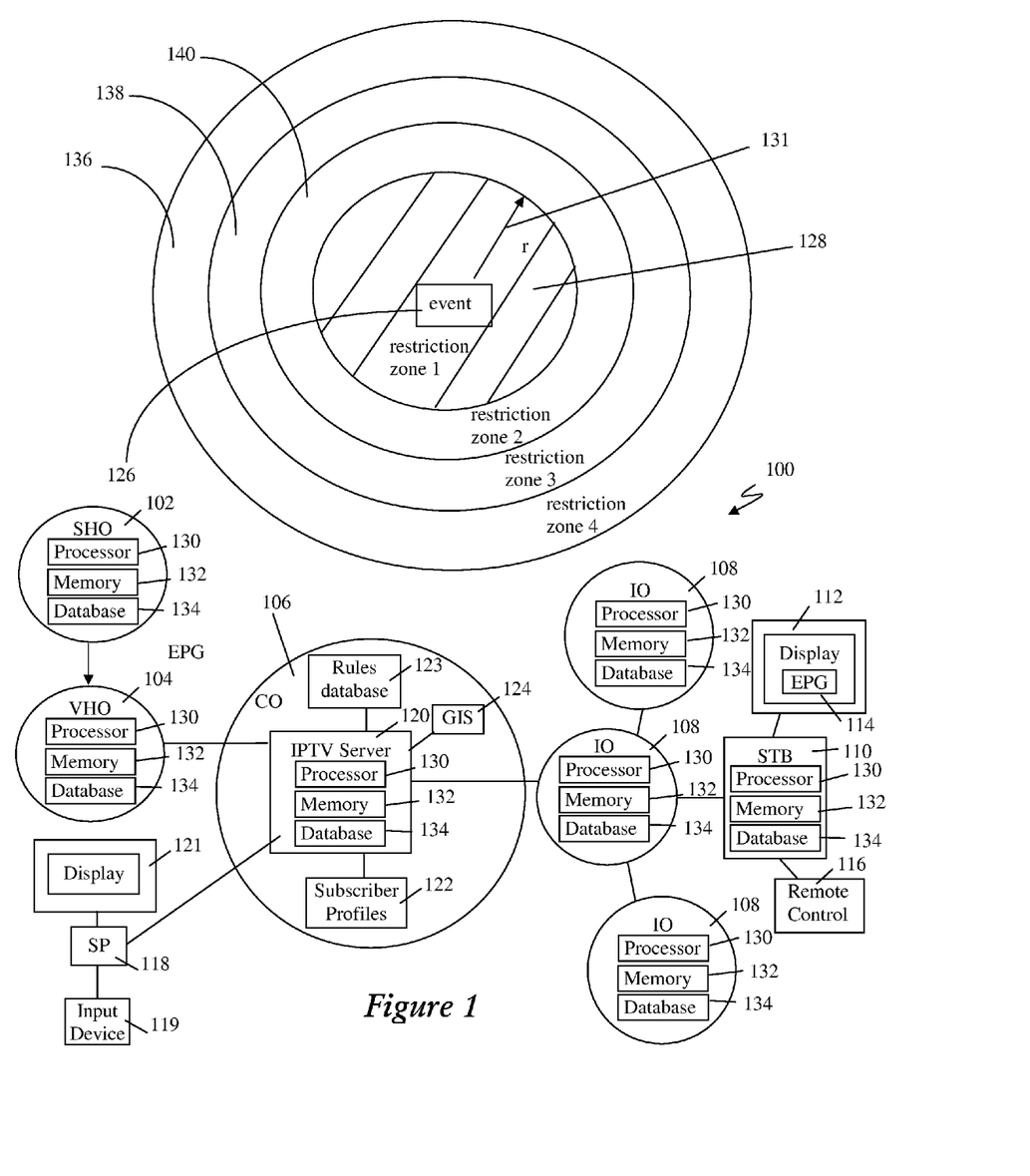
FIG. 1 is a schematic diagram of an illustrative embodiment of an internet protocol television (IPTV) system and geographical restriction zones.

Turning now to FIG. 1 in an illustrative embodiment video data is delivered at a national level in an internet protocol television (IPTV) system 100 to a super head end (SHO) 102. The video data is distributed to various regional video head ends (VHO) 104. The video data is distributed from the VHOs 104 to various central offices (COs) 106. The video data is distributed from the COs to intermediate offices (IOs) 108. The intermediate offices (IOs) deliver the video data to numerous client devices or set top boxes (STBs) 110. Each IPTV server 120, video head end 104, super head end 102, and set top box 110 each contain a processor 130, memory 132, and database 134. The processor is in data communication with the memory. A set of instructions may be stored in the memory along with data comprising the database. Each STB has one or more displays 112 associated with the STB. Each display is capable of displaying an electronic program guide (EPG) 114. Each set top box also has a remote control 116 for entering data and controlling the cursor on display 114. A user or subscriber to the IPTV system may select a listing appearing on the electronic program guide at the display 112 by manipulating remote control 116 to move a cursor over the EPG listing and clicking on the listing to select it. Selection of the EPG listing causes the STB to send a request to an upstream server such as an IO, CO, VHO or SHO in IPTV system. This selection travels from the set top box 110 through the intermediate office 108 to the IPTV server 120. The IPTV server 120 is a source for the electronic program guide which data represented in the electronic program guide can be stored in the IPTV server database 134.

The IPTV server 120 accepts an input from either the subscriber at set top box 111 or from a service provider at 118. The IPTV server may be located at any IPTV system node, i.e., the SHO, VHO, CO or IO. The service provider (SP) 118 is provided with an input device 119 for requesting data from the IPTV server. The IPTV server 120 also has access to subscriber profiles 122, geographic restriction rules 123, and a graphical information system (GIS) 124.

In an illustrative embodiment an electronic program guide (EPG) (also referred to as a graphical user interface) is transmitted from the IPTV server 120 to the set top box 111 and displayed on STD display 112. A subscriber at the STB selects an entry (listing) from the EPG 114 and his selection is transferred back from the STB to the IPTV server 120. The IPTV server determines which geographically restricted video data listing a user has selected and obtains the rules from the rules database 123. Thus the IPTV server need generate and send an EPG containing restriction data only upon request from a client device (i.e., STB). The data for generating the EPG is stored in the IPTV server database.

The geographic restriction rules may be based on the type of programs selected or other criteria including but not limited to a geographical restriction. For example, a selection of a football game may have geographic restriction rules requiring that the game be blacked within 35 miles from the center of the stadium at which the football game is being played, for example, when the game is not sold out before game time. There may also be rules allowing broadcast of the game in various other restricted geographic zones for a fee. Thus, in an illustrative embodiment, a first zone restriction might require a complete black out of the football game within 35 miles of the stadium. In a second restriction zone within 35-45 miles from the stadium a fee of $5 may be charged. In a third restriction zone 45-100 miles from the stadium another fee of, for example, $2 may be charged. In a fourth restriction zone within 100-500 miles from the stadium another fee of $1 may be charged for viewing the football game. In another illustrative embodiment a time restriction may be added to viewing in a particular restriction zone. For example, to provide an incentive toward actual game attendance, the closer a restriction zone is to an event, the longer delay imposed on viewing an event over the IPTV network. In the above example, in the first restriction zone, the game can be blocked out for the first hour, block out for the first 30 minutes in the second restriction zone and no delay in the third and fourth restriction zones.

In another illustrative embodiment an input from input device 119 at the service provider (SP) 118 may request a listing of set top boxes in each of the restriction zones 128, 136, 138, and 140. In another illustrative embodiment of a listing of set top boxes which are viewing or receiving a particular event in each restriction zone may be requested and listed at the service provider display 121. The STBs that are registered and newly registered (within 30 days) can be listed as well.

Figure 2:
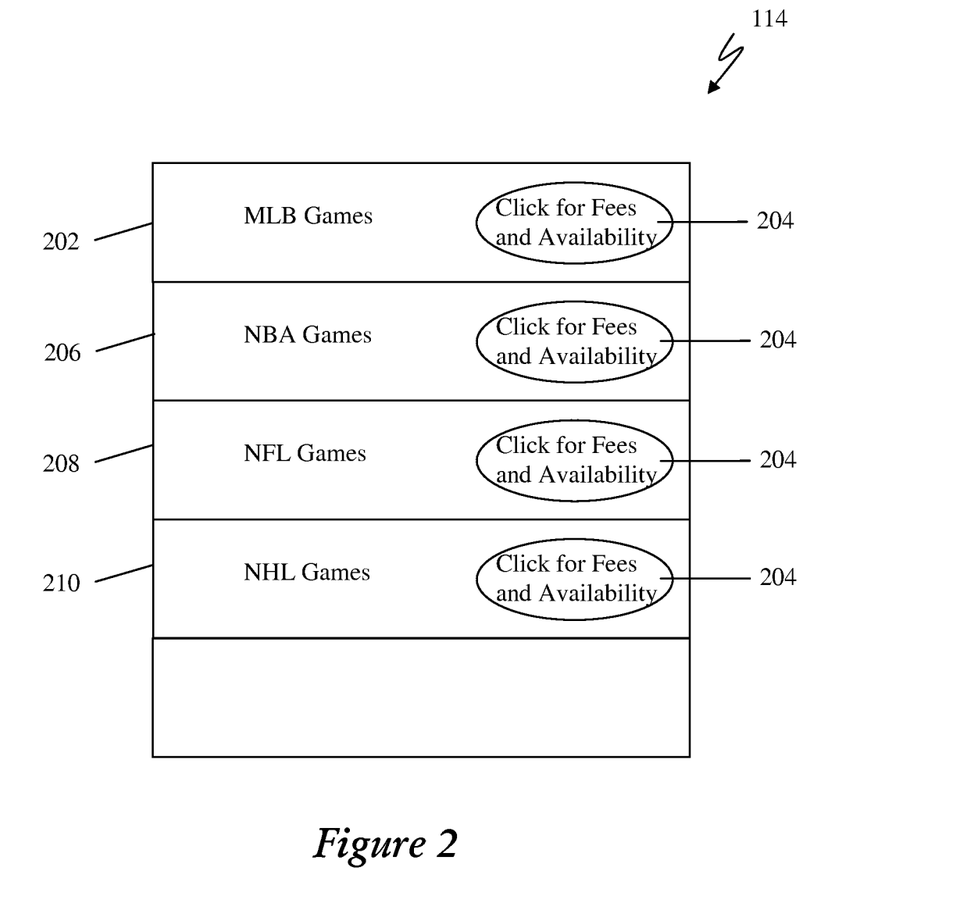
FIG. 2 is an example of a schematic diagram of an electronic program guide (EPG) sent to a client device in an illustrative embodiment.

Turning now to FIG. 2 the electronic program guide (EPG) 114 is shown in an illustrative embodiment. For example, data for displaying an EPG can be sent from the IPTV server 120 to an IPTV client set top box 110 as illustrated in FIG. 1. The EPG data may consist of Major League baseball games 202, basketball games 206, National Football League games 208, and National Hockey League games 210. The EPG data will also present an icon 204 to enable a subscriber at the STB to click on for fees and availability in each one of the categories. For example, a user can use the remote control 116 to select or click on Major League baseball games 202 and click on the "Click for fees and availability" icon 204. This selection sends a request from the STB to the IPTV server requesting fees and availability for viewing MLB games at the STB location.

Figure 3:
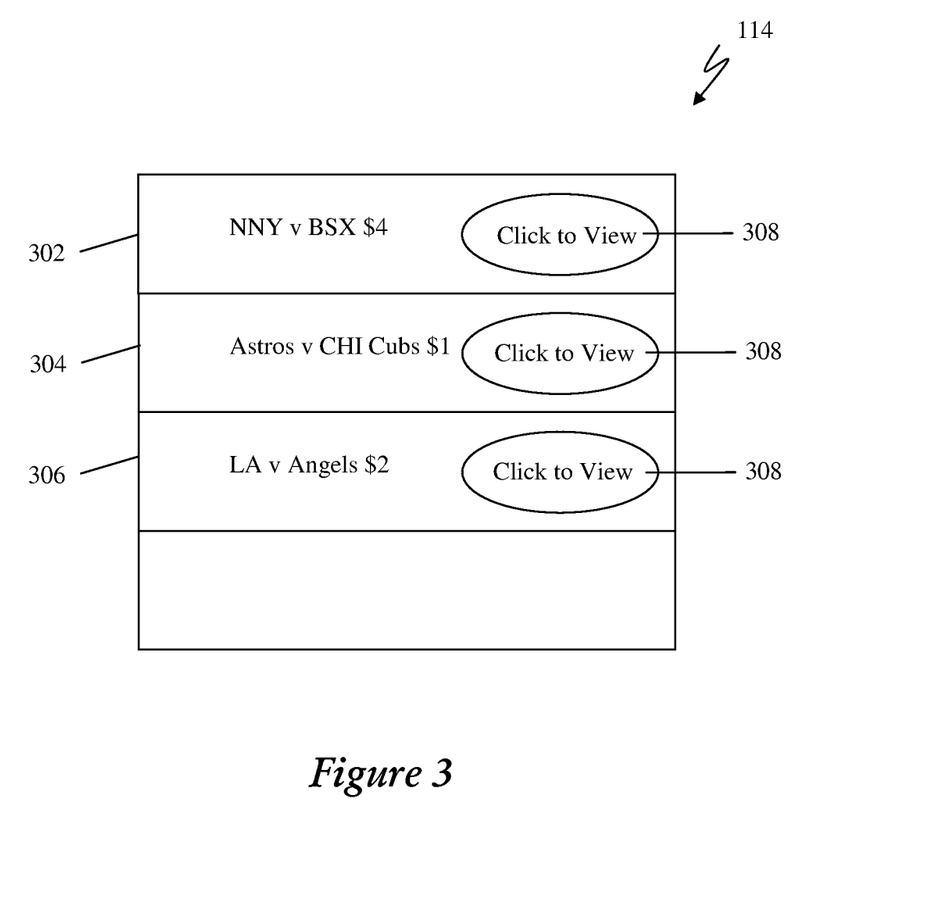
FIG. 3 is an example of a schematic diagram of an EPG containing fees and available video data programming, sent to a client device in an illustrative embodiment.

Turning now to FIG. 3 when the subscriber or user clicks on the "Click for Fees and Availability" icon 204 for Major League baseball games the EPG data that is displayed as EPG 114 of FIG. 3 is sent from the IPTV server to the set top box. As shown in FIG. 3 the IPTV server returns EPG data to display a listing of Major League baseball games available to the remote client and user in the geographic location or restriction zone in which the user resides. For example, the New York Yankees versus the Boston Red Sox can be received and viewed at the STB location for $4 as shown in the EPG of FIG. 3 in box 302. The Houston Astros versus the Chicago Cubs can be received and viewed at the STB location for $1, as shown in EPG listing 304. The Los Angeles Dodgers versus the Anaheim Angels can be received and viewed at the STB location for $2, as shown in EPG listing 306.

Each one of the EPG listings 302 304, 306 in the EPG shown in FIG. 3 can be selected by clicking on a "Click to View" icon 308 next to the desired EPG listing 302, 304 or 306. The "Click to View" icon 308 is selected when a user manipulates the STB remote control input device and a signal or message including data indicating that the Click to View icon for a particular video data segment has been selected, is returned to the IPTV server. Upon receipt of the Click to View selection signal at the IPTV server, the geographic restricted video data becomes available to the subscriber at the STB from which the Click to View selection signal or message originated. The IPTV server then sends the video data to the STB for the subscriber.

Upon selection of a particular category from the EPG data delivered from the IPTV server as shown in FIG. 2 the IPTV server accepts an input request and performs analysis on the input request to determine the availability of the geographically restricted video data to the subscriber at the originating STB in the particular restriction zone in which the STB is located. STB ID data is communicated in a message or signal from the STB to the IPTV server upon selection of an EPG listing 204 so that the IPTV server can retrieve a subscriber profile for the STB ID. The subscriber profile includes a geographic location such as street address or latitude and longitude locations for the STB. The IPTV server 120 takes the street address, latitude and longitude or geographic location of the STB and sends it to the geographic information system (GIS) 124. The IPTV server 120 also provides a central locus or geographic location for the event from which the video data originates, for example, the location of a center of a stadium for a MLB, NBA, WNBA, NHL or professional football game. The IPTV server then determines by the distance between (spatial relationship) the locus of the event 126 and the locus of the STB in which restriction zone the STB is located relative to the location of the event 126. By determining the restriction zone in which the STB is located the IPTV server then can apply the geographic restriction rules from the rules database 123 to determine in which zone the STB is located and what fee or restriction applies to the STB based on the distance of the STB from the locus of the event upon which the geographic restricted fee data is based. Geographic restriction rules include but are not limited to geographic radii or restriction zones for geographically restricted video data and fees for viewing the video data in each zone.

Figure 4:
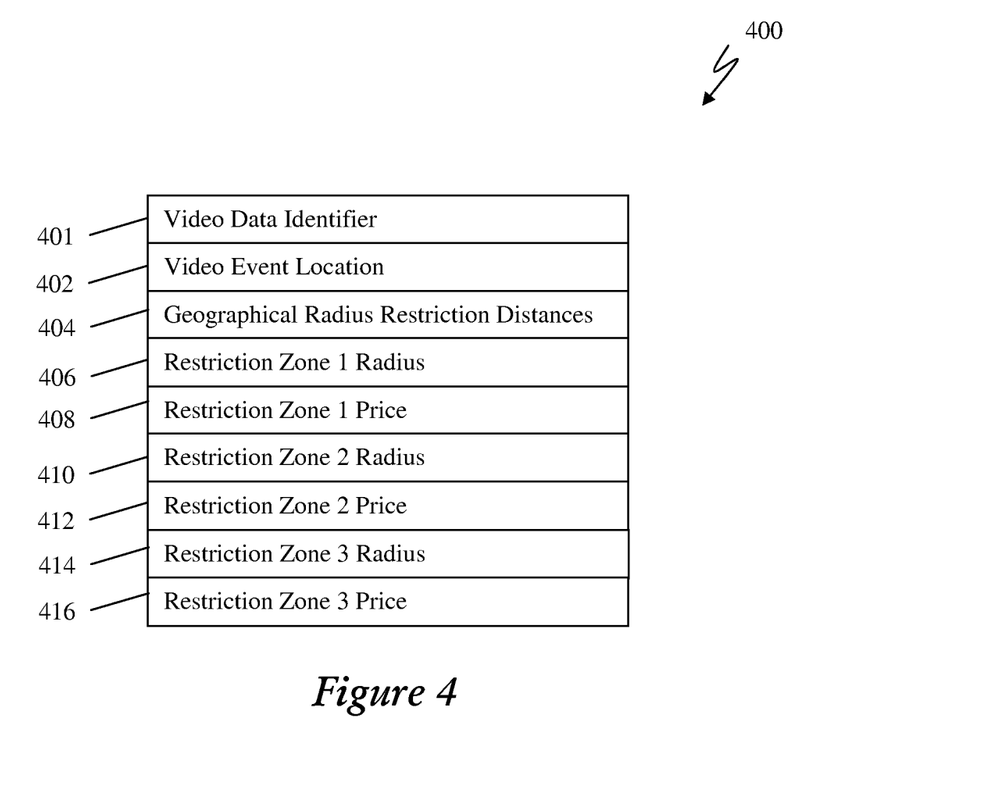
FIG. 4 is an example of a schematic diagram of a data structure for storing restriction data in an illustrative embodiment.

Turning now to FIG. 4 a data structure 400 is illustrated which is utilized an illustrative embodiment. The data structure is embodied in a computer readable medium such as a memory for storing data in the data fields of the data structure. A video data identifier 401 field is provided in the data structure which contains data indicating an identifier for a geographically restricted video data segment. A video event location field 402 is provided in the data structure for containing data indicative of a locus of a video event location. A geographical radius restriction distances field 404 is provided in the data structure for containing data which indicates the radius of the geographical restriction zones relative to the video event location. A restriction zone radius field 406 is provided in the data structure for containing data indicating a radius of a first restriction zone relative to the locus of the event. A restriction zone 1 price field 408 is provided in the data structure for containing data indicating a fee or price for viewing the geographically restricted video data at STB in restriction zone 1 associated with the video data identifier. A restriction zone radius field 410 is provided in the data structure for containing data indicating a radius of a second restriction zone relative to the locus of the event. A restriction zone 2 price field 412 is provided in the data structure for containing data indicating a fee or price for viewing the geographically restricted video data segment data at STB in restriction zone 2 associated with the video data identifier. A restriction zone radius field 414 is provided in the data structure for containing data indicating a radius of a third restriction zone relative to the locus of the event. A restriction zone 3 price field 416 is provided in the data structure for containing data indicating a fee or price for viewing the geographically restricted video data at STB in restriction zone 3 associated with the video data identifier.

Figure 5:
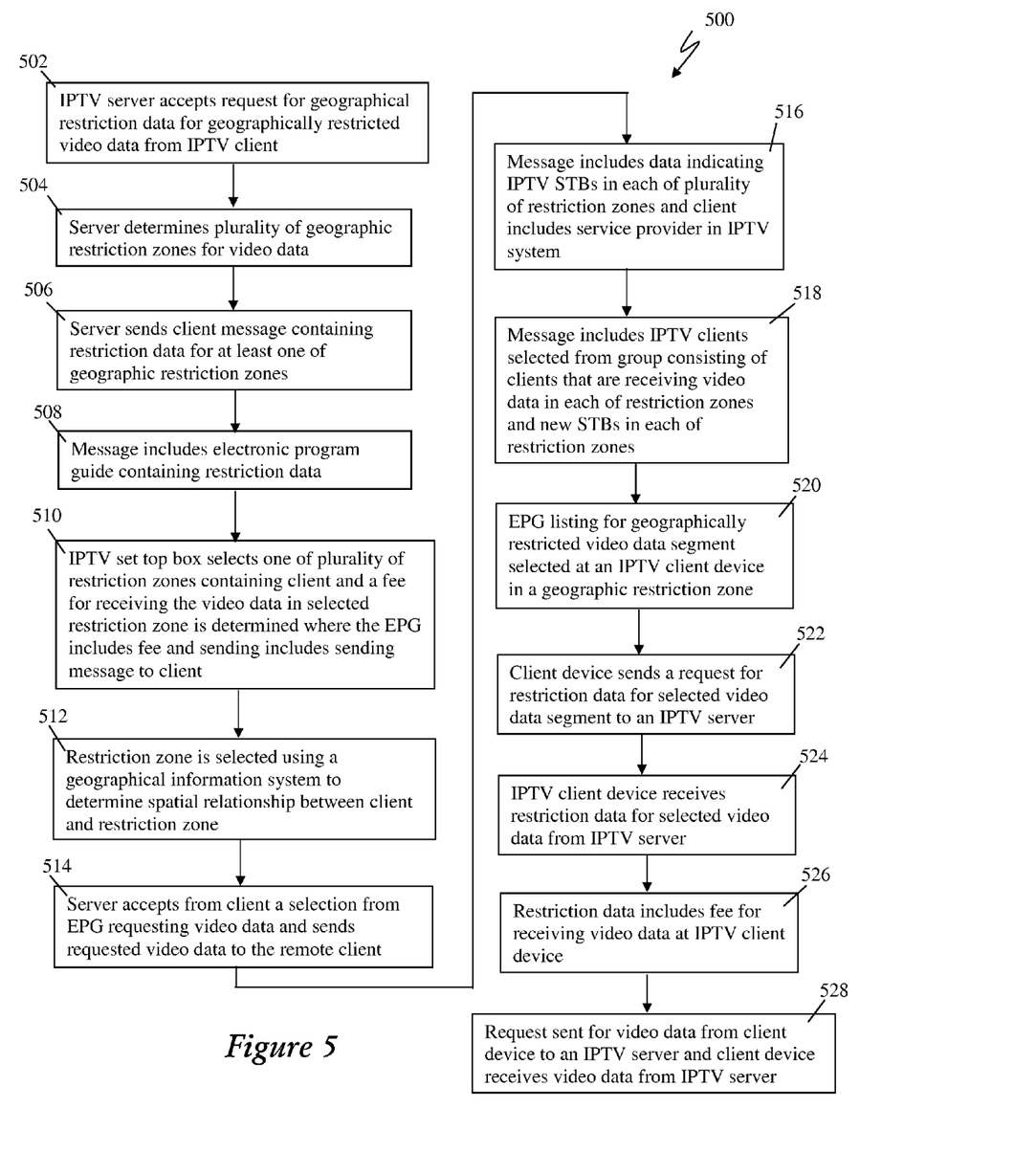
FIG. 5 is an example of functions performed in an illustrative embodiment.

Turning now to FIG. 5 is a flow chart depicting a method for distributing geographically restricted video data in an internet protocol television (IPTV) system. The IPTV server accepts a request for geographical restriction data for geographically restricted video data from the IPTV client device at 502. The IPTV server determines the geographic restriction zones for the geographically restricted video data at 504. The IPTV server sends the client a message containing the restriction data for at one of geographic restriction zones at 506. The IPTV server sends a message that includes an electronic program guide (EPG) data containing the restriction data at 508. The IPTV STB selects one of the plurality of restriction zones containing the client and determines a fee for receiving the video data in the selected restriction zone, the EPG further includes the fee the sending further includes sending the message to the client at 510. The restriction zone is selected using a geographical information system to determine a spatial relationship between the client and the restriction zone at 512. The IPTV server accepts from the client a selection from the EPG requesting the video data and sends the requested video data to the remote client at 514. In a particular embodiment, the message is sent to a service provider input/display device or other IPTV system monitoring device and the message includes data indicating IPTV STBs in each of the plurality of restriction zones at 516. In another particular embodiment, the message may also include IPTV clients selected from the group consisting of clients that are receiving the video data in each of the restriction zones and new STBs (i.e., STBs registered with the IPTV system for 30 days or less) in each of the restriction zones at 518. The IPTV client device in a geographic restriction zone selects an EPG listing for a geographically restricted video data segment at 520. The client device sends a request for restriction data for the selected video data segment to an IPTV server at 522. The IPTV client device receives the restriction data for the selected video data from the IPTV server at 524. The restriction data further includes a fee for receiving the video data at the IPTV client device at 526. A request is sent for the video data from the client device to an IPTV server and the video data from the IPTV server is received at the client device at 528.

Figure 6:
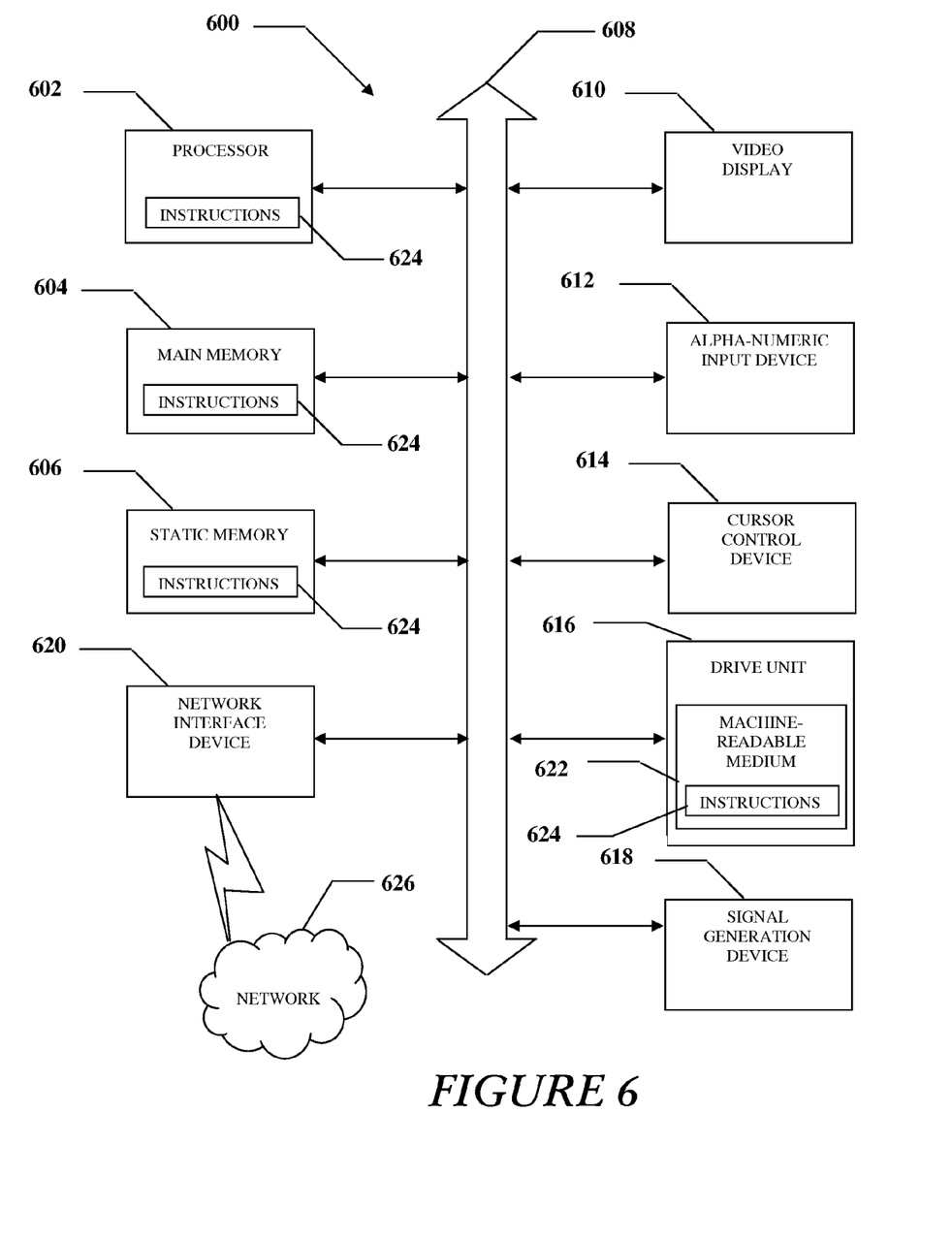
FIG. 6 is a diagrammatic representation of a machine in the form of a computer system within which a set of instructions, when executed, may cause the machine to perform any one or more of the methodologies of the illustrative embodiment.

Turning now to FIG. 6, FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A method for distributing geographically restricted video data in an internet protocol television system, the method comprising: determining at a television server computer at least three geographic restriction zones for the geographically restricted video data and instructions to determine at least three different duration time delays for each of at least three geographic restriction zones, wherein the at least three geographic restriction zones are based on physical proximity of a television client device to a geographic origin of the geographically restricted video data.

2. The method of claim 1, wherein geographic restriction data further comprises fee data for the geographically restricted video data.

3. The method of claim 2, the method further comprising: selecting one of the at least three geographic restriction zones containing an internet protocol television set top box and determining a fee for receiving the geographically restricted video data in a selected geographic restriction zone.

4. The method of claim 1, wherein the at least three geographic restriction zones is selected using a geographical information system to determine a spatial relationship between the television client device and each of the plurality of the geographic restriction zones.

5. The method of claim 1, further comprising: accepting from the television client device a selection from an electronic program guide data requesting the geographically restricted video data; and sending the requested geographically restricted video data from the television server computer to the television client device.

6. The method of claim 5, wherein the electronic program guide data further comprises data indicating internet protocol television client devices located in each of the at least three geographic restriction zones.

7. The method of claim 6 wherein the electronic program guide data further comprises a list of internet protocol television client devices selected from the group consisting of internet protocol television client devices that are receiving the geographically restricted video data in each of the at least three geographic restriction zones and new client devices in each of the geographic restriction zones.

8. The method of claim 1, further comprising: a second internet protocol television server interface for sending electronic program guide data containing the geographically restricted video data for at least one of the at least three geographic restriction zones wherein the geographically restricted video data is available with a shorter time delay in a geographic restriction zone farther from a geographic origin of the geographically restricted video data.

9. A method for receiving geographically restricted video data in a television system comprising: selecting, on a television server processor, an electronic program guide data listing indicating at least three fees for receiving the geographically restricted video data at an internet protocol television client device, wherein a first internet protocol television client device processor makes the geographically restricted video data available with a shorter time delay in at least two geographic restriction zones farther from a geographic origin of the geographically restricted video data.

10. The method of claim 9, wherein the electronic program guide data further comprises fee data for the geographically restricted video data.

11. The method of claim 9, wherein a geographic restriction zone is selected using a geographical information system to determine a spatial relationship between an internet protocol television client device and the geographic restriction zone.

12. The method of claim 9, the method further comprising: receiving the geographically restricted video data requested from the television server processor to the internet protocol television client device.

13. The method of claim 9, wherein the electronic program guide data further comprises data indicating a list of internet protocol television client devices in each of at least three geographic restriction zones.

14. The method of claim 9, wherein the electronic program guide data further comprises a list of internet protocol television client devices selected from a group consisting of internet protocol television client devices that are receiving the geographically restricted video data in each of at least three geographic restriction zones and new internet protocol television client devices in each of the at least three geographic restriction zones.

15. The method of claim 9, wherein the geographic restriction zones are based on physical proximity of an internet protocol television client device to a geographic origin of the geographically restricted video data.

16. The method of claim 9, wherein the geographic restricted video data is available with a shorter time delay in a geographic restriction zone farther from the geographic origin of the geographically restricted video data.

17. The method of claim 9, further comprising: sending a request for the geographically restricted video data to an internet protocol television server; and determining at least three different duration time delays for each of at least three geographic restriction zones, wherein the at least three geographic restriction zones are based on physical proximity of an internet protocol television client device to a geographic origin of the geographically restricted video data.

18. A non-transitory machine readable medium containing data for use by a computer in executing instructions, comprising: a geographical radius restriction distances field for containing data which indicates a radius for geographical restriction zones relative to a video event location, wherein the computer determines at least three different duration time delays for each of at least three geographic restriction zones, wherein the at least three geographic restriction zones are based on physical proximity of an internet protocol television client device to a geographic origin of geographically restricted video data.

19. The non-transitory machine readable medium of claim 18, further comprising: a first restriction zone price field for containing data indicating a fee for viewing the geographically restricted video data at a set top box in a first restriction zone associated with a video data identifier; and a restriction zone radius field for containing data indicating a radius of a second restriction zone relative to a video event location; and a second restriction zone price field for containing data indicating a fee for viewing the geographically restricted video data in a second restriction zone associated with the video data identifier.

20. The non-transitory machine readable medium of claim 19, further comprising: a third restriction zone radius field for containing data indicating a radius of a third restriction zone relative to the video event location; and a third restriction zone price field for containing data indicating a fee for viewing the geographically restricted video data associated with the video data identifier at a client device in the third restriction zone.

\* \* \* \* \*